(12) United States Patent
Hayashi

(10) Patent No.: US 9,980,465 B2
(45) Date of Patent: May 29, 2018

(54) EXERCISE EQUIPMENT

(71) Applicant: DoggyMan H. A. Co., Ltd., Osaka-shi, Osaka (JP)

(72) Inventor: Akio Hayashi, Osaka (JP)

(73) Assignee: DOGGYMAN H. A. CO., LTD., Osaka (JP)

( * ) Notice: Subject to any disclaimer, the term of this patent is extended or adjusted under 35 U.S.C. 154(b) by 219 days.

(21) Appl. No.: 15/066,197

(22) Filed: Mar. 10, 2016

(65) Prior Publication Data

US 2016/0374317 A1  Dec. 29, 2016

(30) Foreign Application Priority Data

Jun. 29, 2015 (JP) .................. 2015-129609

(51) Int. Cl.
| | | |
|---|---|---|
| A01K 15/02 | (2006.01) | |
| A63B 22/00 | (2006.01) | |
| A63B 22/06 | (2006.01) | |
| A63B 21/00 | (2006.01) | |
| A63B 21/28 | (2006.01) | |
| A63B 21/005 | (2006.01) | |
| A63B 22/02 | (2006.01) | |
| A63B 71/06 | (2006.01) | |

(52) U.S. Cl.
CPC ............ *A01K 15/027* (2013.01); *A63B 21/15* (2013.01); *A63B 21/285* (2013.01); *A63B 22/0605* (2013.01); *A63B 21/0058* (2013.01); *A63B 21/154* (2013.01); *A63B 22/02* (2013.01); *A63B 2071/065* (2013.01); *A63B 2208/14* (2013.01); *A63B 2220/20* (2013.01); *A63B 2220/30* (2013.01); *A63B 2225/09* (2013.01)

(58) Field of Classification Search
CPC . A63B 22/02; A63B 2208/14; A63B 22/0605; A01K 15/027; A61H 2203/03
USPC ................ 119/700; 482/54, 57, 61
See application file for complete search history.

(56) References Cited

U.S. PATENT DOCUMENTS

| | | | | |
|---|---|---|---|---|
| 2,155,684 A | * | 4/1939 | Richards ............... | A63B 22/02 119/700 |
| 4,925,183 A | * | 5/1990 | Kim ...................... | A63B 22/16 434/61 |

(Continued)

FOREIGN PATENT DOCUMENTS

JP  S57-1356 A  1/1982

*Primary Examiner* — Yvonne R Abbott-Lewis
(74) *Attorney, Agent, or Firm* — Westerman, Hattori, Daniels & Adrian, LLP

(57) ABSTRACT

An exercise equipment exercise equipment that can readily switch arrangement of a person exercise apparatus and a dog exercise apparatus between the state where a person and a dog run facing each other and/or the state where the person and the dog run side by side. The person exercise apparatus includes a frame, a crank mechanism having a crank shaft rotatably supported by the frame, a crank coupled to the crank shaft, and a pedal rotatably supported by the crank, and a joint rotatingly driven by the crank mechanism. An annular travelling belt travels with a dog, a roller drives the travelling belt, and a transmission mechanism transmits rotational motion of the joint to the roller An input shaft is aligned with a rotary shaft of the joint with respect to a mounting face of the exercise equipment. A coupling mechanisms is detachably engageable with the joint at each end.

2 Claims, 8 Drawing Sheets

(56) References Cited

U.S. PATENT DOCUMENTS

| | | | |
|---|---|---|---|
| 8,794,648 B2 * | 8/2014 | Woelfel | A63B 22/02 119/700 |
| 2004/0176220 A1 * | 9/2004 | Sherman | A63B 22/02 482/57 |
| 2007/0022970 A1 * | 2/2007 | Newman | A01K 15/027 119/700 |
| 2010/0175634 A1 * | 7/2010 | Chang | A01K 15/027 119/700 |

* cited by examiner

[Fig. 1]
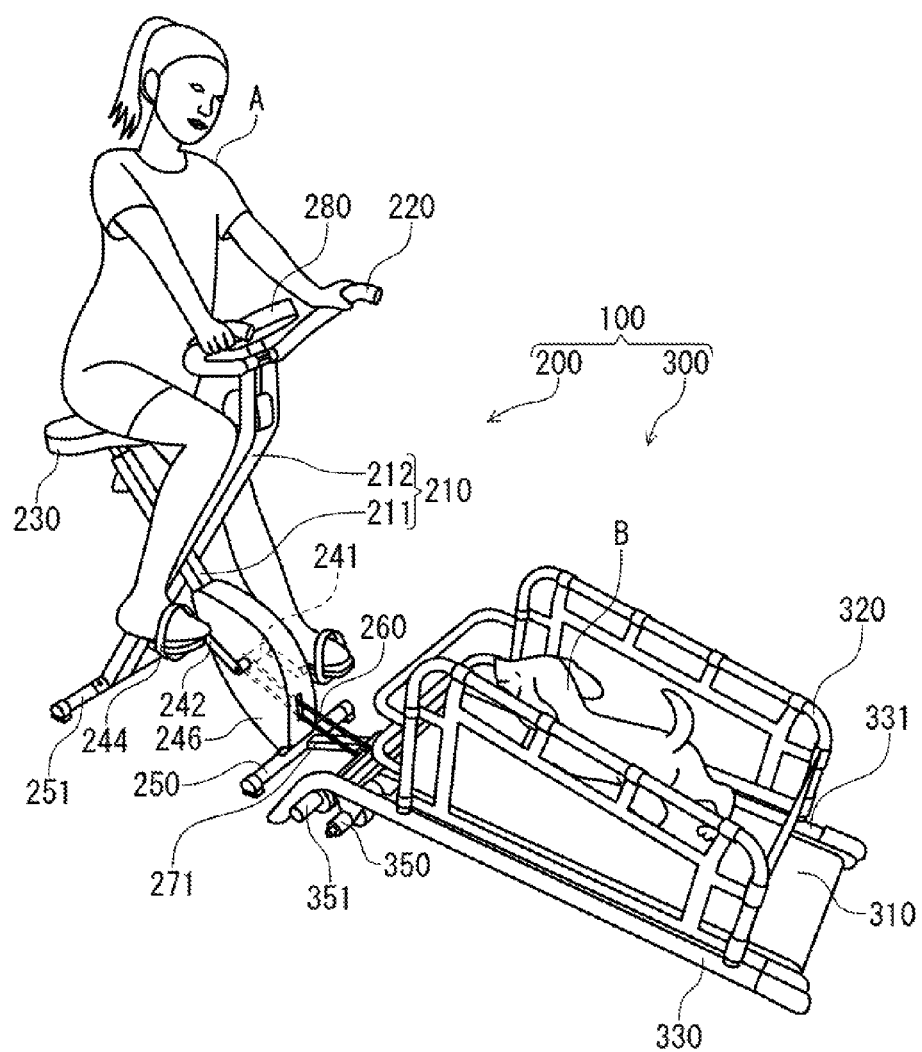

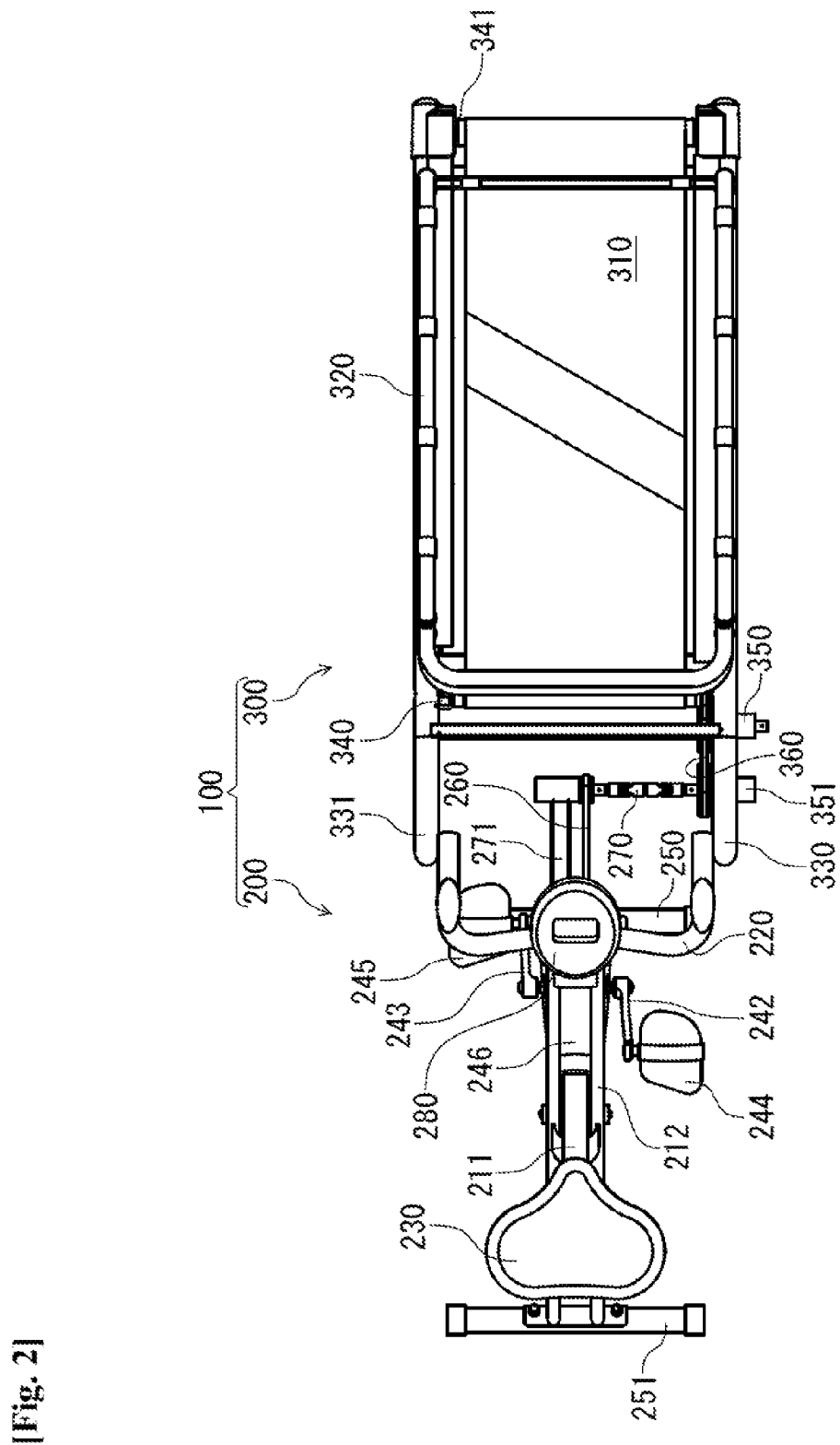
[Fig. 2]

[Fig. 3]
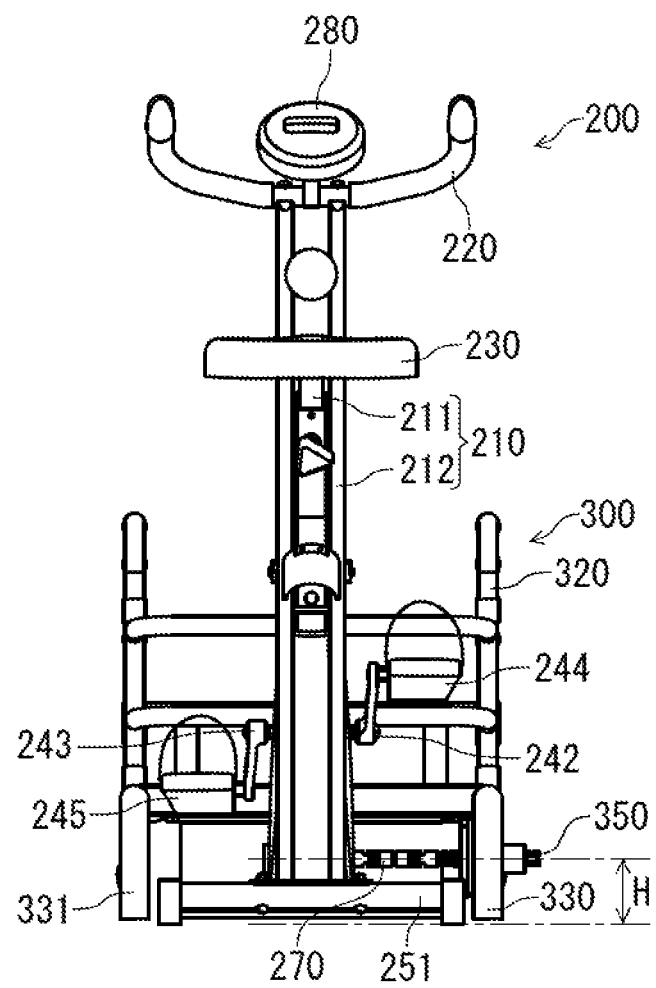

[Fig. 4]
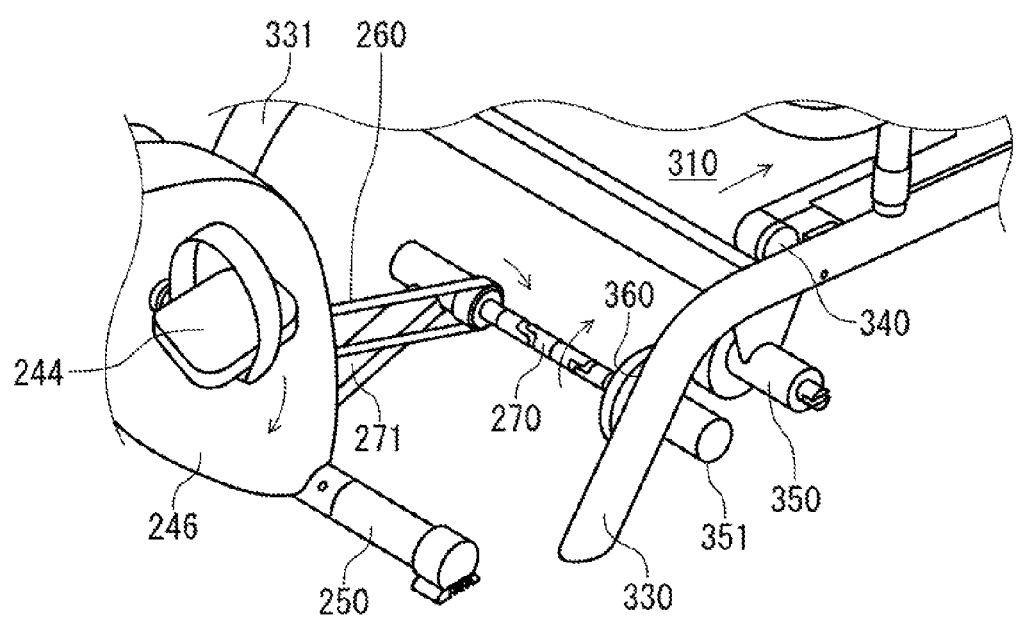

[Fig. 5]
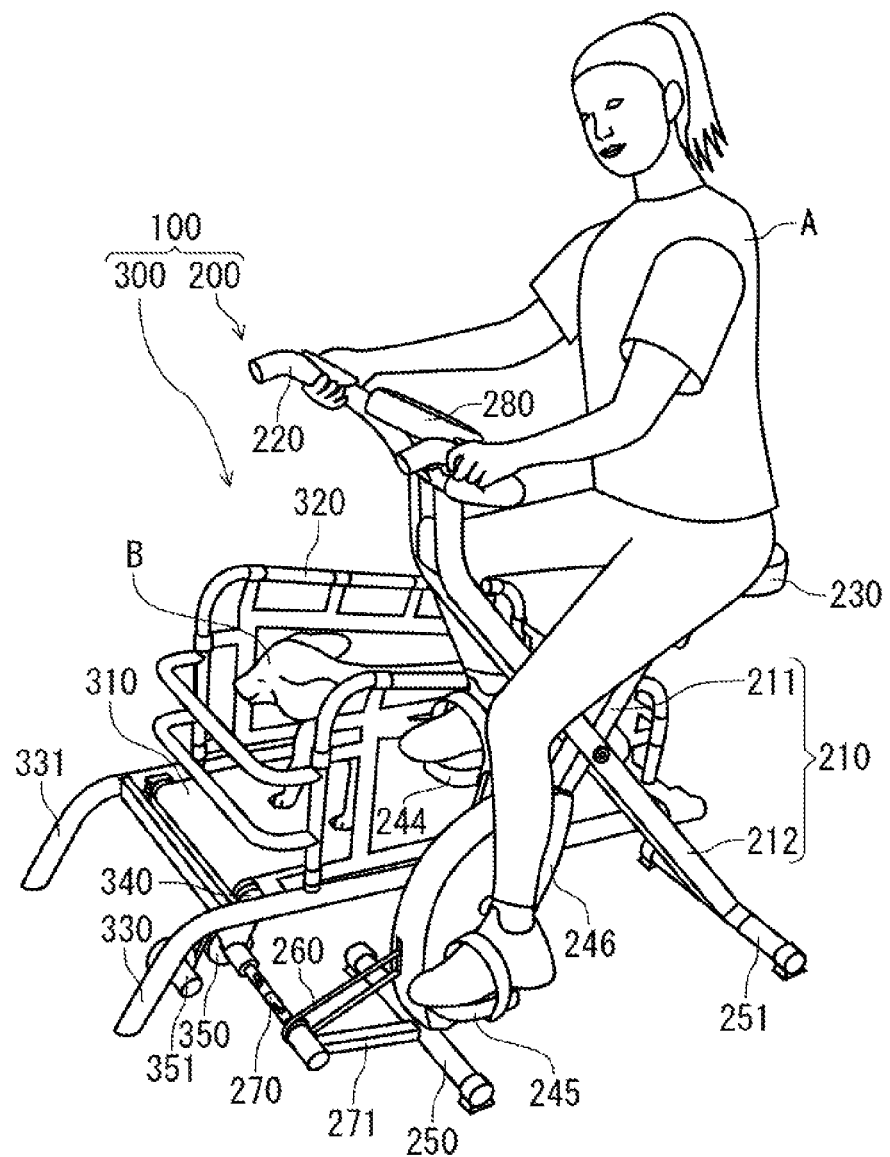

[Fig. 6]
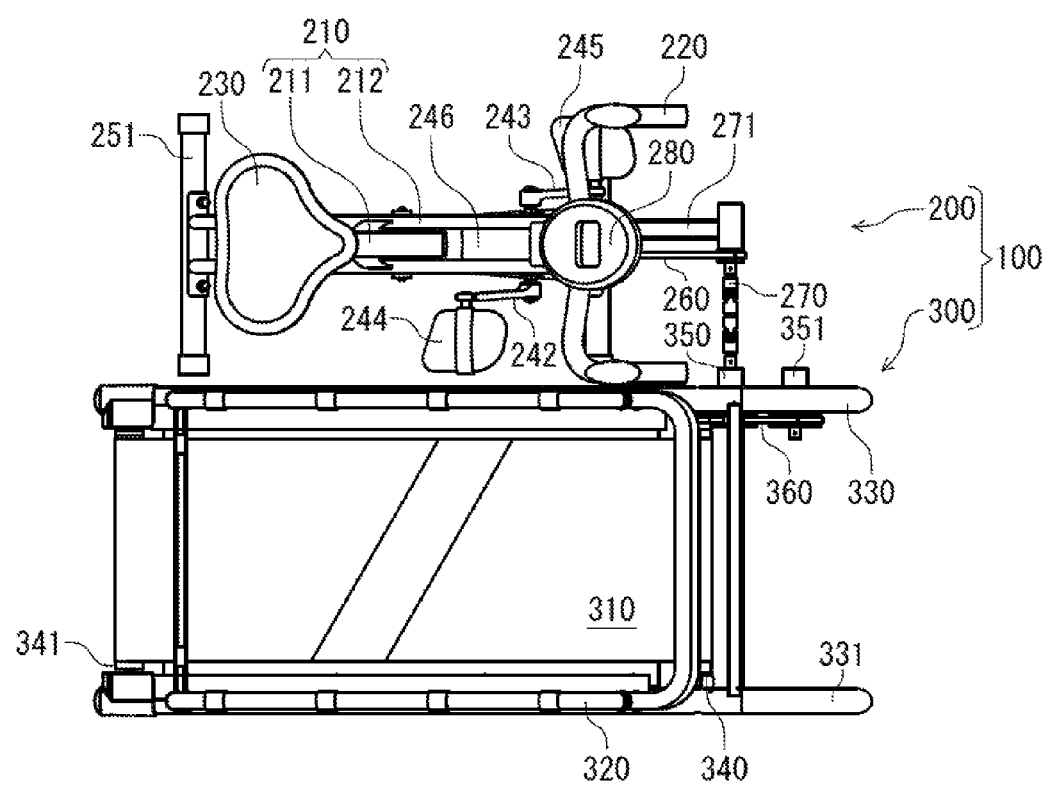

[Fig. 7]
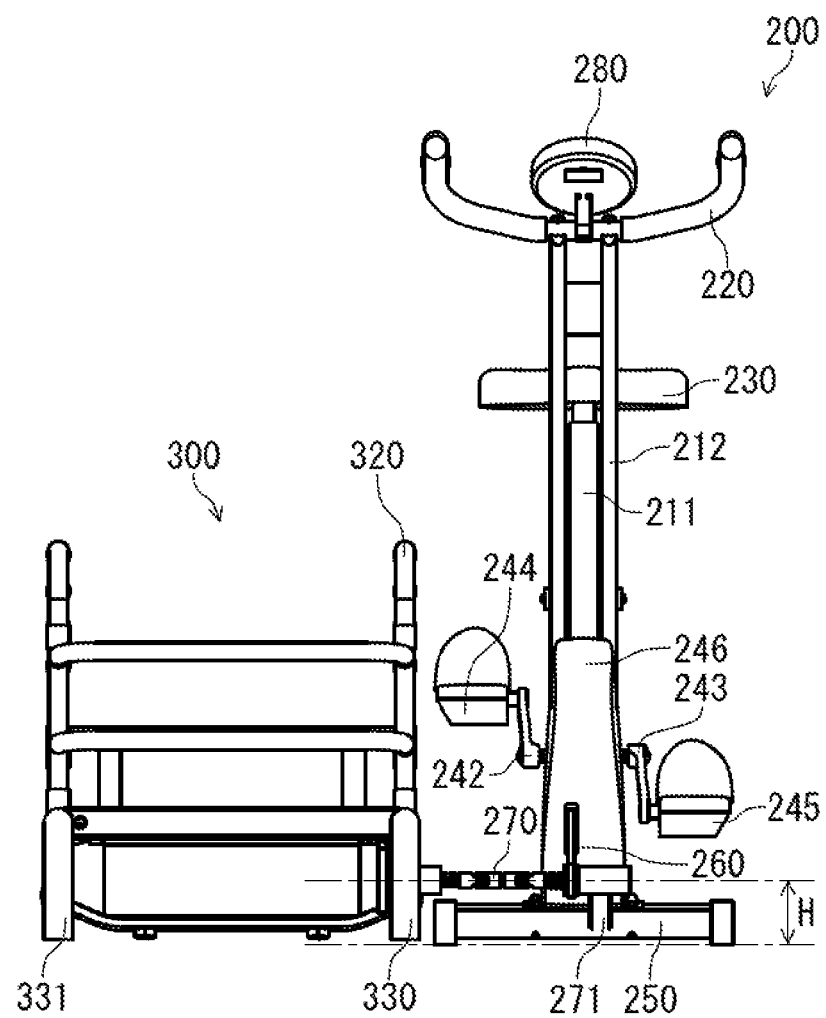

[Fig. 8]
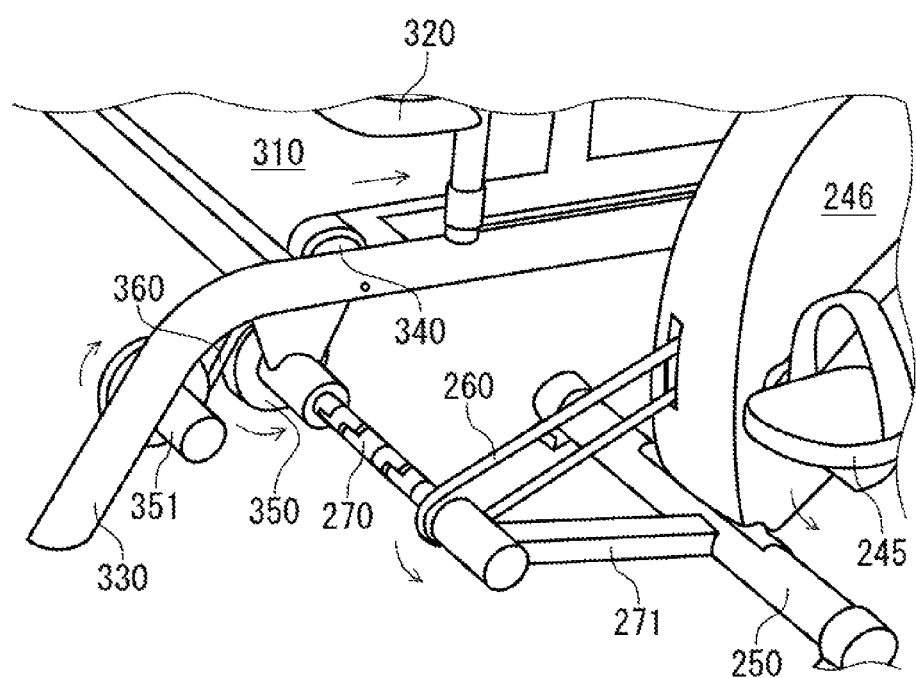

EXERCISE EQUIPMENT

TECHNICAL FIELD

The present invention relates to exercise equipment and in particular, to exercise equipment configured to operate a person exercise apparatus and a dog exercise apparatus in a ganged manner.

BACKGROUND ART

For example, Patent document 1 (Japanese Unexamined Patent Publication No. 57-1356) proposes training equipment constituted of a pedal-type physical training apparatus and a dog exercise apparatus driven by a rotary shaft of the pedal-type physical training apparatus, such that a dog and a person can exercise together easily and delightfully even in narrow space such as an apartment complex, irrespective of weather conditions, as if they are taking a walk.

In the training equipment, the pedal-type physical training apparatus and the dog exercise apparatus are arranged such that the person and the dug face each other. However, the apparatuses may be arranged side by side such that the person and the dog are running a face.

PRIOR ART DOCUMENT

Patent Document

Patent document 1: Japanese Unexamined Patent Publication No. 57-1356

SUMMARY OF THE INVENTION

Problems to be Solved by the Invention

However, in the training equipment proposed in patent document 1, to arrange the pedal-type physical training apparatus and the dog exercise apparatus side by side as if the person and the dog run a race, a belt of a pulley fixed to the rotary shaft of the physical training equipment needs to be crossed, which takes time and effort.

In addition, in the training equipment, to prevent contact of a pedal with the dog exercise apparatus, the dog exercise apparatus must be positioned diagonally in front of the pedal-type physical training apparatus, i.e., not at the side of the pedal-type physical training apparatus. Consequently, the dog is inevitably located in front of the person, and the dog and the person cannot run side by side, leading to a limitation on the arrangement of the apparatuses.

Thus, an object of the present invention is to provide exercise equipment that can readily switch arrangement of a person exercise apparatus and a dog exercise apparatus between the state where a person and a dog face each other and the state where the person and the dog run side by side. In other words, an object of the present invention is to provide exercise equipment that can readily have the state where a person and a dog run facing each other and/or the state where the person and the dog run side by side.

Solutions to the Problems

To attain the object, the present invention provides exercise equipment including a person exercise apparatus, and a dog exercise apparatus driven by the person exercise apparatus, that can readily have the state where a person and a dog run facing each other and/or the state where the person and the dog run side by side. Namely, the state where a person and a dog run facing each other or the state where the person and the dog run side by side can be selected.

The person exercise apparatus includes: a frame; a crank mechanism having a crank shaft rotatably supported by the frame, a crank coupled to the crank shaft, and a pedal rotatably supported by the crank; and a joint rotatingly driven by the crank mechanism. The dog exercise apparatus includes: an annular travelling belt that travels with a dog thereon; a roller that rotatingly drives the travelling belt; and a transmission mechanism that transmits rotational motion of the joint to the roller and has an input shaft, the input shaft being aligned with a rotary shaft of the joint with respect to a mounting face of the exercise equipment, and having coupling mechanisms detachably engageable with the joint at respective ends.

Preferably, in the exercise equipment thus configured of the present invention, the joint is a universal joint configured of members that can be joined to each other at any angle.

Preferably in the exercise equipment thus configured of the present invention, the input shaft includes first and second input shafts that are parallel to each other, and the first and second input shafts each have the coupling mechanism at their opposite ends.

Effects of the Invention

Using the above-mentioned exercise equipment of the present invention, arrangement of the person exercise apparatus and the dog exercise apparatus can be easily switched between the state where a person and a dog face each other and the state where the person and the dog run side by side. Therefore, even in narrow space such as apartment complex, the person and the dog can delightfully exercise while taking various relative positions.

BRIEF DESCRIPTION OF THE DRAWINGS

FIG. 1 is a perspective view illustrating exercise equipment in accordance with an embodiment of the present invention, in which a person exercise apparatus and a dog exercise apparatus are arranged such that a person and a dog face each other;

FIG. 2 is a plan view illustrating the exercise equipment arranged as illustrated in FIG. 1:

FIG. 3 is a back view illustrating the exercise equipment arranged as illustrated in FIG. 1.

FIG. 4 is a partially-enlarged view illustrating a joint between the person exercise apparatus and the dog exercise apparatus in FIG. 1;

FIG. 5 is a perspective view illustrating the exercise equipment in accordance with the embodiment of the present invention, in which the person exercise apparatus and the dog exercise apparatus are arranged such that a person and a dog run side by side.

FIG. 6 is a plan view illustrating the exercise equipment arranged as illustrated in FIG. 5;

FIG. 7 is a front view illustrating the exercise equipment arranged as illustrated in FIG. 5; and FIG. 8 is a partially-enlarged view illustrating the joint between the person exercise apparatus and the dog exercise apparatus in FIG. 5.

EMBODIMENTS OF THE INVENTION

An exercise equipment in accordance with an exemplary embodiment of the present invention will be described below with reference to figures. The figures intend to conceptually illustrate the present invention and thus, for facilitation of understanding, size, ratio, or the number of constituents in the figures may be exaggerated or simplified.

In the exercise equipment in accordance with the embodiment of the present invention in FIGS. 1 to 4, a person exercise apparatus and a dog exercise apparatus are arranged such that a person and a dog face each other. In FIGS. 5 to 8, the person exercise apparatus and the dog exercise apparatus are arranged such that a person and a dog run side by side. FIGS. 4 and 8 are partially-enlarged views illustrating a joint of the person exercise apparatus and the dog exercise apparatus in the above-mentioned two arrangement modes.

As illustrated in FIG. 1, exercise equipment 100 in this embodiment includes a person exercise apparatus 200 and a dog exercise apparatus 300 driven by a rotary shaft of the person exercise apparatus 200. Configuration of the person exercise apparatus 200, configuration of the dog exercise apparatus 300, and a method of using the exercise equipment 100 will be described below in this order.

The person exercise apparatus 200 is an apparatus for exercising person A as well as for driving the dog exercise apparatus 300. The person exercise apparatus 200 includes a frame 210, a handle 220, a saddle 230, a crank mechanism 240, legs 250, 251, a transmission belt 260, a joint 270, and a display 280.

The frame 210 is configured by combining rod members 211, 212 into an X shape. The legs 250, 251 for supporting the frame 210 are attached to respective lower ends of the rod members 211, 212. The saddle 230 as a sear for the person A is attached to an upper end of one rod member 211 so as to be movable along the length of the rod member 211, and the handle 220 for the person A to grip and the display 280 are attached to an end of the other rod member 212. The handle 220 may have an operational lever for operating a brake mechanism described later. The display 280 has a screen for displaying backward speed and travel distance of a travelling belt 310 of the dog exercise apparatus 300.

The crank mechanism 240 is provided at the lower end of the rod member 211. The crank mechanism 240 serves to convert vertical motion of legs of the person A into rotational motion, and includes a crank shaft 241, a pair of cranks 242, 243, a pair of pedals 244, 245, and a cover 246. The crank shaft 241 is rotatably supported by the frame 210 via a bearing not illustrated.

The pair of cranks 242, 243 are attached to respective ends of the crank shaft 241 so as to be opposed to each other, and the pair of pedals 244, 245 are rotatably supported by respective front ends of the cranks. The cover 246 exposes both ends of the crank shaft 241 and covers the remaining portion to protect the crank mechanism 240. Accordingly, when the person A vertically moves his/her legs on the pair of pedals 244, 245, the vertical motion of the legs of the person A rotates the crank shaft 241. The crank mechanism 240 may include a brake mechanism (not illustrated) for decelerating the rotational speed of the crank shaft 241 in the cover 246.

An arm 271 extending toward the front side of the person exercise apparatus 200 is fixed to the front leg 250, and one end the joint 270 is rotatably attached to the arm. The joint 270 may be detachably attached to the arm 271.

The joint 270 A is arranged such that its rotary shaft is parallel to the crank shaft 241. The transmission belt 260 extends between the joint 270 and a pulley (not illustrated) fixed to the crank shaft 241. Accordingly, the rotational motion of the crank shaft 241 is transmitted to the joint 270 via the transmission belt 260.

The other end of the joint 270 (the end opposite to the end on the side of the arm 271) is selectively engaged with or connected to either of rotary shafts of pulleys 350, 351 of the below-mentioned dog exercise apparatus 300 (See FIGS. 4 and 8). For this reason, the other end of the joint 270 (hereinafter referred to as engaging end) in this embodiment has, for example, a protruding piece fitted into either of recesses formed at ends of the rotary shafts of the pulleys 350 and 351.

The joint 270 is a universal joint configured of members that can be joined to each other at any angle. Therefore, when the joint 270 engages with the rotary shaft of the pulley 350 or 351 of the dog exercise apparatus 300, even if the rotary shaft of the joint 270 does not align with the rotary shaft of the pulley 350 or 351 of the dog exercise apparatus 300, rotational motion of the person exercise apparatus 200 can be transmitted to the dog exercise apparatus 300 without damaging the joint 270 and the pulleys 350, 351.

Next, the dog exercise apparatus 300 will be described. The dog exercise apparatus 300 travels with a dog B thereon, and is driven by the person exercise apparatus 200. The dog exercise apparatus 300 may be driven by any suitable apparatus other than the person exercise apparatus 200 (for example, an electric motor). The dog exercise apparatus 300 includes the travelling belt 310, a fence 320, legs 330, 331, rollers 340, 341, and the pulleys 350, 351.

The travelling belt 310 is an endless annular belt that is enough wide for a dog to place thereon. The fence 320 is provided above the travelling belt 310 so as to prevent the dog B from falling out of the dog exercise apparatus 300 during travelling. The fence 320 is supported by the pair of right and left legs 330, 331.

The pair of rollers 340, 341 are rotatably supported between the pair of right and left legs 330, 331, and the travelling belt 310 extends between the rollers. Accordingly, the travelling belt 310 is driven by the roller 340.

As illustrated in FIGS. 4 and 8, the leg 330 is provided with the pulleys 350, 351. The pulleys 350, 351 are transmission mechanisms for transmitting rotational motion of the joint 270 to the roller 340, and have respective rotary shafts that are parallel to each other (See FIG. 2 and FIG. 6). In this embodiment, the pulleys 350, 351 each transmit rotational motion to the roller 340 via a belt 360. Other mechanisms such as gear may be used as the transmission mechanisms. Although the two pulleys are used in this embodiment, one or three or more pulleys may be used.

In this embodiment, the roller 340 and the pulleys 350, 351 are arranged such that their rotary shafts are parallel to each other. As illustrated in FIGS. 3 and 7, the rotary shafts of the pulleys 350, 351 and the rotary shaft of the joint 270 of the person exercise apparatus 200 have the same distance (height) H from a mounting face of the exercise equipment 100.

One ends of the rotary shafts of the pulleys 350, 351 each are provided with a coupling mechanism that detachably engages with the engaging end of the joint 270. Specifically describing, as illustrated in FIG. 4, the rotary shaft of the pulley 350 has a recess that engages with the protruding piece formed at the engaging end of the joint 270, at its outer end. The rotary shaft of the pulley 351 has a similar recess at its inner end.

Alternatively, the rotary shaft of the pulley 350 may have a coupling mechanism at its inner end, and the rotary shaft of the pulley 351 may have a coupling mechanism at its outer end. In such case, the coupling mode between the joint 270 and the pulleys 350, 351 increases to increase relative positions that can be taken by the person A and the dog B, enhancing pleasure. Further, when only one pulley is used to drive the roller 340 as described above, the coupling mechanism is provided at both ends of the rotary shaft of the pulley. The coupling mechanism is not limited to the recess corresponding to the protruding piece.

Thus, the rotational motion generated in the crank mechanism 240 while the person A steps the pedals is transmitted to the rollers 340, 341 via the transmission belt 260, the joint 270, the pulleys 350, 351, and the belt 360 (See arrows in FIG. 4 and FIG. 8). Then, with rotation of the rollers 340, 341, the travelling belt 310 moves backward. Thereby, the dog B can run forward in both cases where the person and the dog run face-to-face as illustrated in FIG. 1, and run side by side as illustrated in FIG. 5.

A method of using the exercise equipment 100 thus configured will be described below. The person exercise apparatus 200 is detachably coupled to the dog exercise apparatus 300 via the joint 270 and the pulleys 350, 351. The person exercise apparatus 200 and the dog exercise apparatus 300 are arranged such that the person A and the dog B face each other as illustrated in FIG. 1 or the person A and the dog B run side by side as illustrated in FIG. 5, depending on which of the ends of the rotary shafts of the pulleys 350, 351 engages with the joint 270.

Specifically describing, when the engaging end of the joint 270 is engaged with or connected to the inner end of the rotary shaft of the pulley 351 as illustrated in FIG. 4, the person exercise apparatus 200 and the dog exercise apparatus 300 are arranged such that the person A and the dog B face each other as illustrated in FIG. 1. On the contrary, when the engaging end of the joint 270 is engaged with the outer end of the rotary shaft of the pulley 350 as illustrated in FIG. 8, the person exercise apparatus 200 and the dog exercise apparatus 300 are arranged such that the person A and the dog B run side by side as illustrated in FIG. 5. In use of either of the person exercise apparatus 200 or the dog exercise apparatus 300, engagement between the joint 270 and the rotary shaft of the pulley 350 or 351 may be released.

As distinct from the complicated operation such as rearrangement of a belt, such operation of engaging the joint 270 with the pulley 350 or 351 is simple. Moreover, because the universal joint is used as the joint 270, even if the joint 270 engages with the rotary shaft of the pulley 350 or 351 in the state where the rotary shaft of the joint 270 misaligns with the rotary shafts of the pulleys 350, 351, rotational motion of the crank shaft 241 can be transmitted to the roller 340 without damaging the joint 270 and the pulleys 350, 351.

In the exercise equipment 100, arrangement of the person exercise apparatus 200 and the dog exercise apparatus 300 can be easily changed and therefore, the person A and the dog B can delightfully exercise while easily changing their relative positions.

DESCRIPTION OF REFERENCE SIGNS

100 Exercise equipment
200 Person exercise apparatus
210 Frame
220 Handle
230 Saddle
240 Crank mechanism,
241 Crank shaft,
242, 243 Crank
241, 245 Pedal
246 Cover
250, 251 Leg
260 Transmission belt.
270 Joint
271 Arm
280 Display
300 Dog exercise apparatus,
310 Travelling belt
320 Fence
330, 331 Leg
340, 341 Roller
350, 351 Pulley
360 Belt.

The invention claimed is:

1. Exercise equipment comprising:
a person exercise apparatus; and
a dog exercise apparatus driven by the person exercise apparatus, having a state where a person and a dog run facing each other and/or the state where the person and the dog run side by side, wherein
the person exercise apparatus includes:
a frame;
a crank mechanism having a crank shaft rotatably supported by the frame, a crank coupled to the crank shaft, and a pedal rotatably supported by the crank; and
a joint rotatingly driven by the crank mechanism, and the dog exercise apparatus includes:
an annular travelling belt that travels with a dog thereon;
a roller that rotatingly drives the travelling belt; and
a transmission mechanism that transmits rotational motion of the joint to the roller, and has an input shaft, the input shaft being aligned with a rotary shaft of the joint with respect to a mounting face of the exercise equipment, and having coupling mechanisms detachably engageable with the joint at respective ends,
wherein the input shaft includes first and second input shafts that are parallel to each other, and
the first and second input shafts each have the coupling mechanism at opposite ends.

2. The exercise equipment according to claim 1, wherein the joint is a universal joint configured of members that can be joined to each other at any angle.

* * * * *